(12) United States Patent
Broome et al.

(10) Patent No.: US 7,995,259 B2
(45) Date of Patent: Aug. 9, 2011

(54) OPTICAL PATTERN GENERATOR USING A SINGLE ROTATING OPTICAL COMPONENT WITH RAY-SYMMETRY-INDUCED IMAGE STABILITY

(75) Inventors: Barry G. Broome, Carlsbad, CA (US); Thomas R. Myers, Palo Alto, CA (US); Leonard C. DeBenedictis, Palo Alto, CA (US); David A. Dewey, Sunnyvale, CA (US)

(73) Assignee: Reliant Technologies, Inc., Mountain View, CA (US)

( * ) Notice: Subject to any disclaimer, the term of this patent is extended or adjusted under 35 U.S.C. 154(b) by 634 days.

(21) Appl. No.: 12/125,052

(22) Filed: May 21, 2008

(65) Prior Publication Data
US 2008/0291518 A1    Nov. 27, 2008

Related U.S. Application Data

(60) Provisional application No. 60/939,149, filed on May 21, 2007.

(51) Int. Cl.
*G02B 26/08*    (2006.01)

(52) U.S. Cl. .................................................. 359/211.1

(58) Field of Classification Search .............. 359/198.1, 359/211.1, 216.1, 831–837
See application file for complete search history.

(56) References Cited

U.S. PATENT DOCUMENTS

| | | | |
|---|---|---|---|
| 1,154,835 A | 9/1915 | Bauersfeld | |
| 2,255,892 A | 9/1941 | Leventhal | |
| 3,619,033 A | 11/1971 | McMahon | |
| 3,721,486 A | 3/1973 | Bramley | |
| 3,845,298 A | 10/1974 | Runciman | |
| 4,113,367 A | 9/1978 | Fritzler | |
| 4,165,464 A | 8/1979 | Ikeda et al. | |
| 4,289,371 A | 9/1981 | Kramer | |
| 4,387,952 A | 6/1983 | Slusher | |
| 4,428,643 A | 1/1984 | Kay | |
| 4,606,601 A | 8/1986 | Starkweather | |
| 5,000,529 A | 3/1991 | Katoh et al. | |
| 5,646,764 A | 7/1997 | Moore et al. | |
| 6,813,030 B2 | 11/2004 | Tanno | |
| 6,836,364 B2 | 12/2004 | Dube et al. | |
| 7,184,184 B2 | 2/2007 | DeBenedictis et al. | |
| 7,372,606 B2 | 5/2008 | Broome et al. | |
| 2001/0007068 A1 | 7/2001 | Ota et al. | |
| 2003/0032950 A1 | 2/2003 | Altshuler et al. | |
| 2005/0285928 A1* | 12/2005 | Broome et al. | ............... 347/235 |

OTHER PUBLICATIONS

"FR-103XL: Rapid Scanning Auto/Crosscorrelator," Femtochrome® Research, Inc., 4 pages.
PCT International Search Report and Written Opinion, PCT/US05/28095, Jul. 7, 2006, 12 pages.

(Continued)

*Primary Examiner* — Euncha Cherry
(74) *Attorney, Agent, or Firm* — Wood, Herron & Evans, LLP

(57) ABSTRACT

An optical pattern generator uses a rotating component that includes a number of deflection sectors containing optical elements. Each sector deflects an incident optical beam by a substantially constant angle although this angle may vary from one sector to the next. The constant deflection angle is achieved by symmetry within the deflection sector, specifically gut-ray symmetry. The rotating component may be combined with an imaging group that produces, for example, image points, spots, or lines displaced along a line locus. The image spots can also be displaced to either side of a line, for example by introducing a tilt in the orthogonal direction or by introducing light beams at various angles to the plane of symmetry.

9 Claims, 11 Drawing Sheets

OTHER PUBLICATIONS

PCT International Search Report and Written Opinion, PCT/US06/04821, Feb. 26, 2007, 8 pages.
PCT International Search Report and Written Opinion, PCT/US08/64440, Sep. 4, 2008, 7 pages.
Yasa, Z.A. et al., "A Rapid-Scanning Autocorrelation Scheme for Continuous Monitoring of Picosecond Laser Pulses," Optics Communications, Mar. 1, 1981, pp. 406-408, vol. 36, No. 5.

* cited by examiner

OPTICAL PATTERN GENERATOR USING A SINGLE ROTATING OPTICAL COMPONENT WITH RAY-SYMMETRY-INDUCED IMAGE STABILITY

RELATED APPLICATION(S)

This application claims priority under 35 U.S.C. §119(e) to U.S. Provisional Patent Application Ser. No. 60/939,149, "Optical Pattern Generator Using a Single Rotating Optical Component with Ray-Symmetry-Induced Image Stability," filed May 21, 2007. The subject matter of the foregoing is incorporated herein by reference in its entirety.

BACKGROUND OF THE INVENTION

1. Field of the Invention

This invention relates generally to optically generating a pattern of figures such as arrays of image points, spots, or lines. More particularly, this invention relates to generating such patterns using a single rotating component that has a plurality of deflection sectors that deflect an incident optical beam by various amounts.

2. Description of the Related Art

The optical generation of a pre-defined pattern of spots or scan lines is used in a variety of applications. Digital copiers, printers, fingerprint identification, hand-held bar code scanners, industrial applications, light show entertainment, displays, telecommunications switching and medical applications are a few examples. Perhaps the most common mechanisms for generating patterns of figures are tilting mirrors (e.g., oscillating mirrors driven by galvanometers) and reflections from rotating convex polygons.

However, optical pattern generators based on tilting mirrors typically have characteristics that make them unsuitable for certain applications. For example, scanning in these systems is typically achieved by tilting a mirror back and forth. But back and forth motion requires that the mirror come to a stop and then reverse direction. This takes time, which limits the scan rate. In order to increase the scan rate of these systems, the mirror often is driven with an oscillating motion at a rate that is near its resonant frequency. However, this severely restricts the patterns that can be generated. For example, it is difficult to generate irregular patterns since the mirror motion is constrained to be oscillatory. The near-resonance condition also limits the range of scan rates that can be achieved. For example, it is difficult to tune such a system over a wide range of scan rates since the near-resonance condition cannot be met over a wide range. In addition, the angular scan velocity of resonant scanners is usually sinusoidal and not suitable for a large number of applications where dwell time at each point must be reasonably constant.

If a two-dimensional pattern is desired (e.g., a series of parallel scan lines or a two-dimensional pattern of spots), then typically either a single mirror is tilted in two directions simultaneously or two coordinated, tilting mirrors are used. In many cases the efficiency of the utilization of light, such as laser light, is also important. The efficiency may be defined as the fraction of energy deposited in a desired pattern on the treatment surface compared to the total energy produced by the light source in a given period of time. If a pattern is sparse compared to the background, it is preferable to turn off the light source and scan quickly over the background, and then turn it back on when the light beam has settled over the spot to be exposed and expose the spots in the pattern in such a manner that the light source is efficiently utilized in time. This requires an even more responsive device that can accelerate, decelerate and settle quickly. As a result of these characteristics, galvanometer-based systems and convex polygon systems are not well suited for high speed pattern generation, particularly if the pattern is an irregular or a sparse one.

In the rotating polygon approach, the sides of a three-dimensional polygon are mirrored and the polygon is rotated about a center axis. As each mirrored side rotates through an incident optical beam, the optical beam is reflected to generate a point on a scan line. The rotation of each mirrored side through the optical beam produces one scan line. If all of the mirrored sides are the same (e.g., make the same pyramid angle with the base of the polygon), then the same scan line is traced over and over. If the mirrored sides are different, then different scan lines can be traced as each side rotates through the optical beam. For example, by varying the pyramid angle of each side, the reflected optical beam can trace a series of scan lines.

However, the rotating polygon approach also has drawbacks that make it unsuitable for certain applications. For example, systems that produce a series of scan lines can suffer from aberrations due to the rotation. In order to trace a series of scan lines, each side has a different pyramid angle that offsets the basic scan line in a direction that is perpendicular to the scan direction. However, as each side rotates through the optical beam, the orientation of the angled side is also rotated. This can cause changes in the amount of offset and/or other unwanted aberrations. One example is scan line bow. The ideal scan line is generally a straight line segment but the actual scan line is often an arc segment. The sag of the arc segment is the bow. In the case of rotating polygon scanners, sides that have non-zero pyramid angles generate bowed scan lines. The amount of bowing depends on the pyramid angle. In a polygon scanner where different pyramid angles are used to trace multiple scan lines or to generate spots at different locations, not only will each scan line be bowed, but the bow will vary from one scan line to the next. The difference between the bow of the top-most scan line and the bottom-most scan line can be significant.

Scan line bow and other effects caused by rotation can cause additional problems, depending on the application. For example, in some applications, the scanning action is used to compensate for motion of the scanner relative to a target so that the optical beam ideally remains at a fixed spot on the target even though the scanner is moving relative to the target. In this case, scan line bow will cause the optical beam to move in the direction perpendicular to the scan direction. If this motion is slow compared to the dwell time of the optical beam on the target, then the bow effectively introduces an unwanted motion in the perpendicular direction. If the motion is fast relative to the dwell time of the optical beam on the target, then the bow, which is a radial deflection, when combined with the uncompensated tangential motion, effectively blurs the optical beam, increasing the spot size of the beam on the target. Typically, neither effect is desirable.

Thus, there is a need for optical pattern generators than can operate at high speeds, possibly with long dwell times at each image point, particularly for the generation of irregular patterns. There is also a need for pattern generators with reduced aberrations and/or image blurring.

SUMMARY OF THE INVENTION

The present invention overcomes the limitations of the prior art by providing an optical pattern generator using a single rotating component. The rotating component includes a number of deflection sectors containing optical elements. Each sector deflects an incident optical beam by a substantially constant angle although this angle may vary from one sector to the next. The constant deflection angle is achieved by symmetry within the deflection sector, specifically gut-ray symmetry as will be further described below. The rotating component may be combined with an imaging group that produces, for example, image points, spots, or lines displaced along a line locus. The image spots can also be displaced to either side of a line, for example by introducing a tilt in the orthogonal direction or by introducing light beams at various angles to the plane of symmetry.

This approach can result in many advantages. The use of a single rotating component with sectors that are positioned contiguously around its periphery can provide a high radiometric efficiency. The geometry of a rotating component such as a thin disk with optical elements located on the periphery facilitates rotation at high angular velocities, thus producing image patterns at high rates of speed. The angular velocity of the rotating component combined with the pseudo-stationary angular deflection can be used to cause the individual image points, spots, or lines to deliver high radiant energy doses to a small point in the image space with high radiometric efficiency. The angular deflection is pseudo-stationary in the sense that each deflection sector produces an approximately constant angular deflection as it rotates through the incident optical beam, but each deflection sector can have a different constant angular deflection.

In more detail, the gut-ray is the chief ray of the entering axial ray bundle for an optical system and is generally co-incident with the optical axis of the first element of a centered optical system. For decentered optical systems, the gut-ray is typically the ray from the central object point that passes through the system aperture stop.

Gut-ray symmetry can be determined as follows. Fix the rotating component at a specific angle and trace the gut-ray through the relevant deflection sector for this angle. For this specific angle of rotation, the deflection sector is gut-ray symmetric if there is some point on the gut-ray optical path, such that the angular deflections experienced by the gut-ray propagating forward from this point are symmetric to the angular deflections experienced by the gut-ray propagating backwards from this point. If gut-ray symmetry is satisfied for all angles as the deflection sector rotates through the incident optical beam, then the deflection sector is gut-ray symmetric. Gut-ray symmetry can exist in one plane of a rotating system while not existing in an orthogonal plane of the system. In this case, the system is gut-ray symmetric in only one plane. Some systems are gut-ray symmetric in only one plane and some systems are gut-ray symmetric in both orthogonal planes that include the direction of the incident gut ray propagation. If all deflection sectors exhibit gut-ray symmetry, then the rotating component is completely gut-ray symmetric.

In one aspect of the invention, the deflection sectors use reflective surfaces which permit the optical pattern generator to be independent of the wavelengths of the incident optical beams and thereby permits the simultaneous identical pattern generation of several different wavelengths in applications that can benefit from this condition. For example, the deflection sectors can be based on free space propagation between mirrored surfaces. As another example, the deflection sectors can be based on rhomboid (or other types) of prisms, where the optical beams are propagating within the prism. Note that gut-ray symmetry is not limited to any specific relation between the surface normals of the reflective surface and the plane of rotation. For example, the surface normals are not required to lie in the plane of rotation in order to satisfy gut-ray symmetry (although they could be), as will be seen in the examples below.

The deflection sectors need not be exactly gut-ray symmetric. If gut-ray symmetry is closely approximated but not met exactly, the output beam will be nearly (but not exactly) angle-invariant. The more that the gut-ray symmetry condition is violated, the more that the output beam deviates from angle-invariance. However, in many applications, this deviation will be acceptable. In some applications, it may even be desirable. For example, this deviation may be used to compensate for motion of a moving handpiece for a fractional dermatological laser treatment to reduce the movement of the optical beam relative to the treatment surface, as described in U.S. Pat. No. 7,184,184, which is herein incorporated by reference.

In certain embodiments, an optical pattern generator includes a single rotating component that has a plurality of deflection sectors arranged on the outer periphery of a rotating disk. The incident optical beam propagates parallel to the plane of rotation of the disk. In one design, the incident optical beam passes over the center of rotation of the disk and subsequently impinges on the deflection sectors. The deflection sectors each contain two reflective surfaces. The incident optical beam is reflected by the surfaces and exits the deflection sector. Different deflection sectors on the disk can have a different included angle between their reflective surfaces such that the exiting beam will be deflected at a different fixed angle within the plane of rotation by each deflection sector. The two reflective surfaces of each deflection sector are arranged in a rhomboid geometry, for example a rhomboid prism or a mirror-pair. The rhomboid prism or mirror-pair are arranged on the rotating disk such that they exhibit gut-ray symmetry with respect to rotation of the deflection sector through the incident optical beam.

An arrangement of two mirrors or the surfaces of a rhomboid prism that is forced to closely approximate gut-ray symmetry has the quality that the deflection angle changes by a very small amount as the pair of mirrors or the rhomboid prism rotates through the incident optical beam. Therefore, the pair of reflective surfaces or the prism with rhomboid geometry with near gut-ray symmetry at the periphery of a rotating disk component will move through the incident optical beam and produce an exit optical beam that has a nearly constant deflection angle and an essentially constant exit pupil position with respect to the incident optical beam. Successive rhomboid prisms or mirror-pair deflection sectors may have different included angles such that different sectors can deflect the exiting optical beam at different fixed angles. This geometry therefore produces a nearly pseudo-stationary deflection (PSD) pattern. When the gut-ray symmetry is fully satisfied, the geometry produces an exactly pseudo-stationary (PSD) pattern.

This example geometry produces an output optical beam from the rotating component that is collimated (assuming a collimated incident optical beam). The output optical beam can be presented to subsequent imaging optics at a set of selectable beam angles corresponding to different sectors. The subsequent imaging optics can include a simple reflective objective that produces an image pattern that is independent of the wavelengths present in the incident beam. Refractive, diffractive, or holographic objective systems can also be used.

For this embodiment, example image patterns include a series of image points displaced along an image line locus if the reflective surfaces have a tilt component in only a single direction. The image pattern can include image points displaced in a zig-zag pattern along the image line locus if the reflective surfaces also have a small tilt component in the orthogonal direction.

To reduce thermal blooming or other unwanted effects due to the sequential irradiation of adjacent image points, the sectors on the rotating component can be designed such that non-neighboring points in the image pattern are sequentially irradiated without reducing the speed or radiometric efficiency of the system. Galvanometric and other pattern generators typically do not have this capability.

The optical pattern generators described above can be used for various applications. For example, they can be used to deposit optical energy onto human tissue, either externally onto the skin for example or internally through various orifices. The optical energy can be used to accomplish different purposes: local heating, ablation, cutting, or cauterizing, for example. The devices can also be used to deposit optical energy onto other materials: metal, powders, or other industrial materials, for example. Cutting, welding, ablation, and marking are examples of manufacturing processes that can be implemented. The devices can also be used in laser or LED printers, optical imaging scanners, or copy machines. Other applications will be apparent.

Other aspects of the invention include methods corresponding to the devices, systems and applications described above.

BRIEF DESCRIPTION OF THE DRAWINGS

The invention has other advantages and features which will be more readily apparent from the following detailed description of the invention and the appended claims, when taken in conjunction with the accompanying drawings, in which:

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1A:
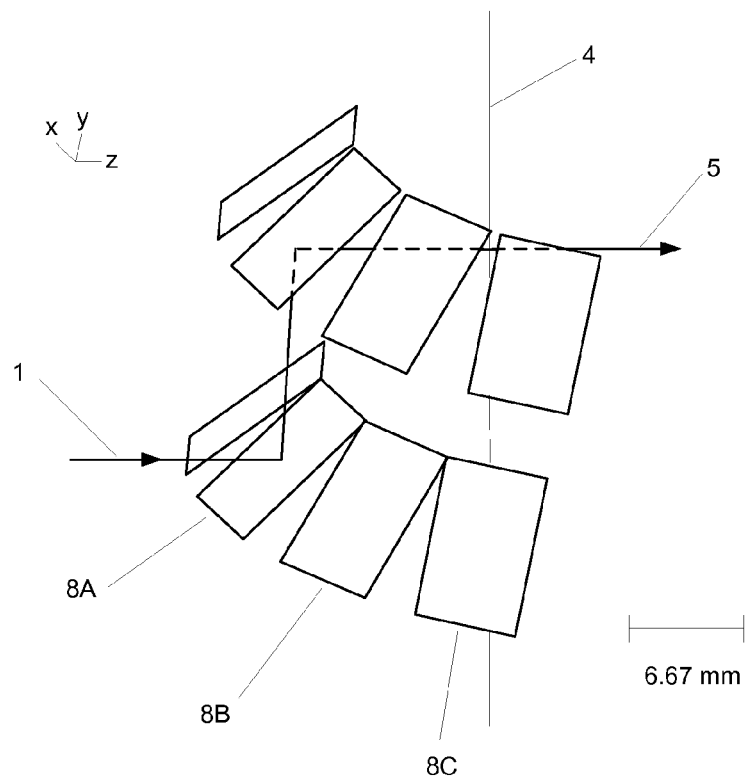
FIG. 1A is a diagram of an optical pattern generator illustrating various aspects of the invention.

FIG. 1A is a diagram of an optical pattern generator illustrating various aspects of the invention. In this example, a rotating component 9 is divided into many sectors 8A, 8B, 8C, etc., which are arranged in a circle centered on the rotation axis 4 of the rotating component 9. An optical beam 1 is incident on the different sectors 8 as they rotate through the beam. At least a majority of the sectors 8 includes optical elements that are substantially gut-ray symmetric in the plane comprising the axis of rotation and the direction of the incident gut ray, as the rotating component 9 is rotated around its axis of rotation 4 and the sector 8 rotates through the incident optical beam 1.

As the component 9 rotates, the sectors 8 rotate through the incident optical beam 1. The point where a sector 8 is midway through its rotation through the optical beam 1 will be referred to as the mid-rotation position or mid-rotation angle. Each sector 8 deflects the incoming optical beam 1 by some angular amount. The sectors 8 are designed so that the angular deflection is approximately constant as each sector rotates through the incident optical beam 1, due to the gut-ray symmetry. However, as the disk 9 rotates to the next sector 8 and the next set of gut-ray symmetric optical elements, the angular deflection can be changed by changing the design of the optical elements in that sector (e.g., by using a different included angle between opposing reflective surfaces). As a result, the angular deflection of the exit optical beam 5 may vary from sector to sector. Each sector 8 can produce a different angular deflection. Alternately, some sectors can produce the same angular deflection as other sectors. Different patterns of angular deflections can be achieved.

For example, the sectors 8 can be arranged around the disk 9 so that the angular deflection increases monotonically as the disk rotates. Alternately, the angular deflections could be arranged in a sequence such that the final delivered spots are not produced in sequential order. In other words, if the pattern is an array of spots 1, 2, 3, . . . 29, the sectors may be designed to generate the spots in an order other than sequentially from 1 to 29. For certain applications, producing adjacent spots within a short period of time can cause thermal coupling between the irradiated regions, and this can be deleterious to proper treatment. By arranging the prisms appropriately, the spots can be delivered such that temporally successive spots are spatially separated from each other while still delivering the full pattern of spots.

There is another geometric symmetry that is beneficial for some applications. Certain applications benefit by image patterns that are arranged to be in a zig-zag rather than a straight line geometry. For example, in some biologic applications, if the image spots are arranged along a straight line and high irradiance levels are present, the irradiation may accidentally cut tissue in the manner of a laser scalpel. Depositing the image spots in a zig-zag pattern substantially reduces the propensity for cutting or for undesirable thermal damage to biologic tissue while still permitting the thermal treatment level to be delivered. The deflection sectors 8 can also be designed to have an orthogonal tilt angle applied to produce the lateral spot displacements used to produce a zig-zag geometry.

Figure 1B:
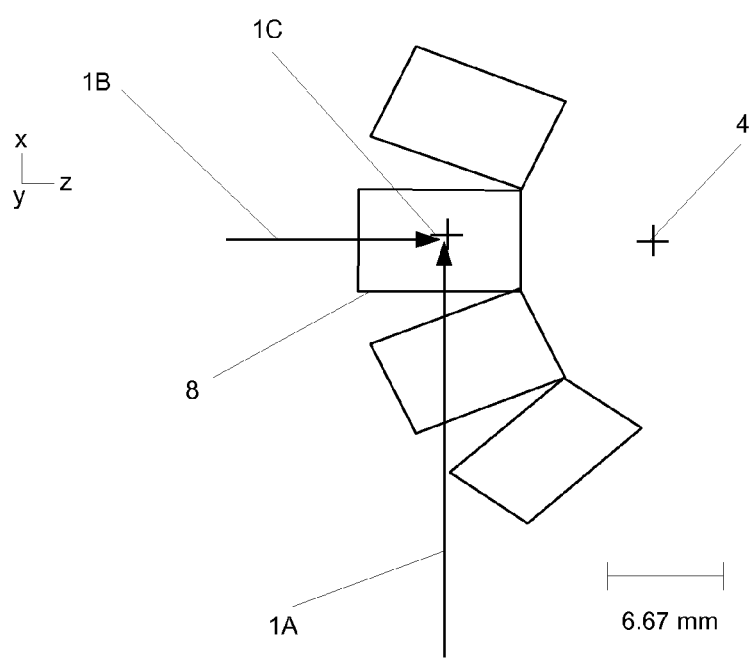
FIG. 1B is a diagram illustrating different angles of incidence for an incoming optical beam.

Gut-ray symmetry can be applied to many different types of optical pattern generators. Optical pattern generators can be classified in part by the direction of the incident optical beam 1, the orientation of the basic optical configuration used in the deflection sector, and the direction of the exit optical beam 5. FIG. 1B shows three different examples of incident optical beam 1. In this Figure, the axis of rotation 4 lies along the y direction and the x-z plane is the plane of rotation. For convenience, optical beam 1A will be described as tangentially incident, optical beam 1B will be described as radially incident (the beam shown is inward radially incident; the opposite direction would be outward radially incident), and optical beam 1C will be described as normally incident or perpendicularly incident. Similar terms can be used to describe the exit optical beam 5 (either individually, or as a group, since exit optical beams 5 for different deflection sectors will have different exit angles). FIG. 1B is not limiting. The incident and exit optical beams are not limited to the orthogonal directions shown. They can also propagate along skew directions relative to the rotating component 9.

FIGS. 2-3 illustrate various examples of optical elements that can exhibit gut-ray symmetry.

Figure 2A:
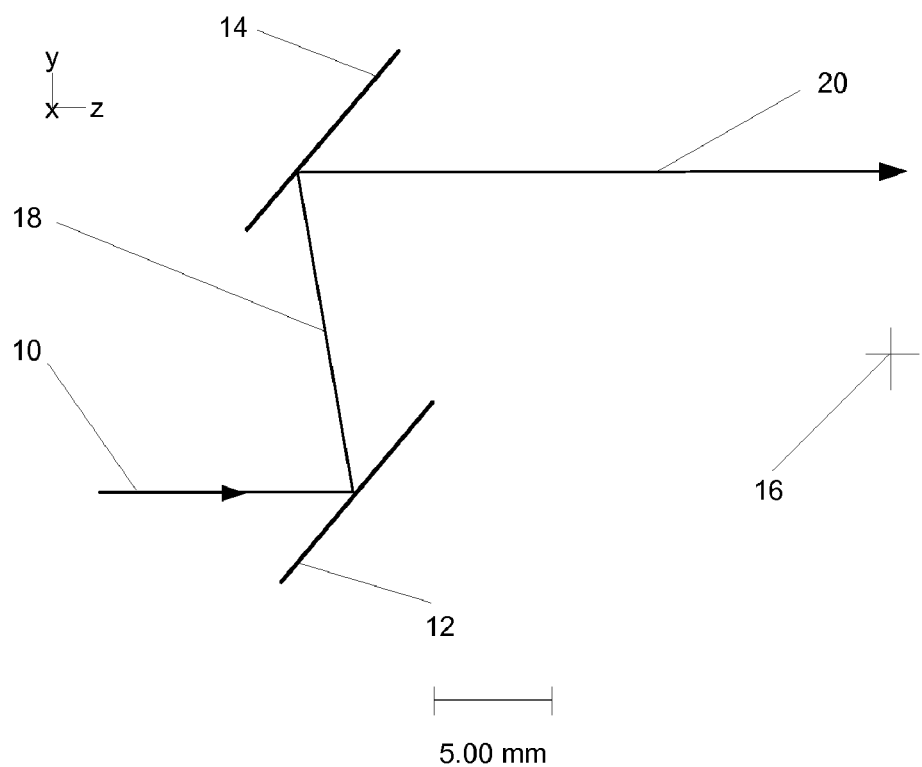
FIGS. 2A and 2B are a side view and top view of an exemplary gut-ray symmetric optical device based on a two-mirror rhomboid geometry.
Figure 2B:
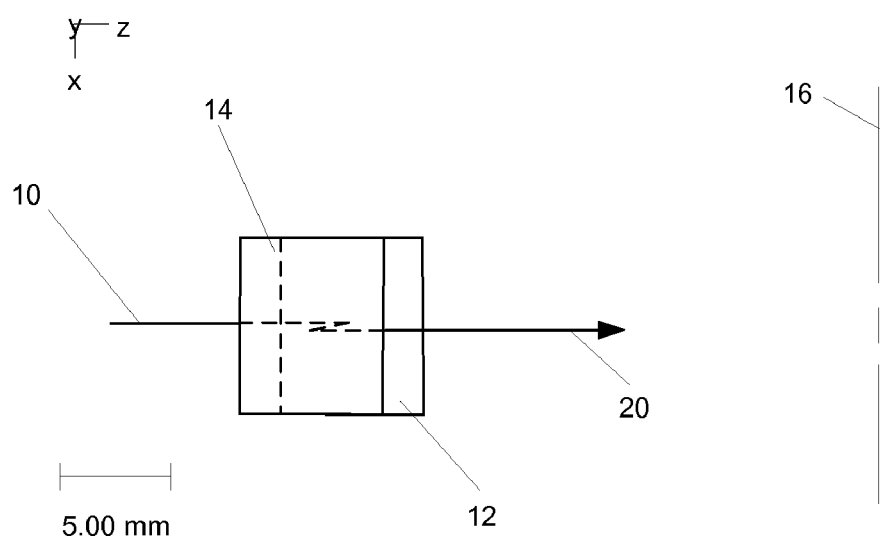

FIGS. 2A and 2B are a side view and top view of an exemplary gut-ray symmetric optical device based on a two-mirror rhomboid geometry. Referring to FIG. 2A, the center of rotation of the two-mirror pair is 16 and the axis of rotation protrudes from the plane of the figure. Rotation of the two-mirror system is in the plane of the figure (i.e., about the x-axis). An incident gut-ray 10 is reflected from mirror 12 and is subsequently reflected from mirror 14. The gut-ray exits as ray 20. Point 18, which can be located anywhere along the gut-ray optical path between mirror 12 and mirror 14, is the point of deflection symmetry. The gut-ray optical path within the device is symmetric about this point with respect to angular deflections. Propagating forward, the gut-ray is incident on mirror 14 at some angle and its direction is changed due to reflection off the mirror 14. Propagating backward, the gut-ray is incident on mirror 12 at the same angle and its direction is changed by the same amount due to reflection off the mirror 12. Such a point of deflection symmetry exists for all positions of the two-mirror device as it rotates through the incident beam 10. The optical system of FIG. 2A is shown rotated several degrees from its mid-rotation position. The incidence angle at mirror 12 and the incidence angle at mirror 14 are identical. Thus, the two-mirror device is gut-ray symmetric in this view.

FIG. 2B shows a top view of the two-mirror system of FIG. 2A. Due to the position of the rotation axis 16 relative to the two-mirror component, the incidence angles at mirror 12 and at mirror 14 are both zero in this view. Because the angles are identical in this view, they are symmetric with respect to the point of deflection symmetry and gut-ray symmetry is also satisfied in this view (i.e., in the x-z plane). The optical device of FIGS. 2A and 2B therefore has an output ray angle that is constant in both planes of action as the two-mirror device is rotated about the axis 16.

In FIGS. 2A and 2B, the exit optical beam 20 is approximately parallel to the incident optical beam 10. This is not required and other implementations will deviate from this. For example, if mirrors 12 and 14 are tilted relative to each other in the y-z plane (plane of FIG. 2A), then the exit optical beam 20 will be angularly deflected in the y-z plane. Note, however, that the mirrors will still satisfy gut-ray symmetry even if they are not parallel. Similarly, relative tilts can be used to achieve angular deflection in the x-z plane (plane of FIG. 2B), but a small violation of the gut-ray symmetry will then exist.

Figure 3A:
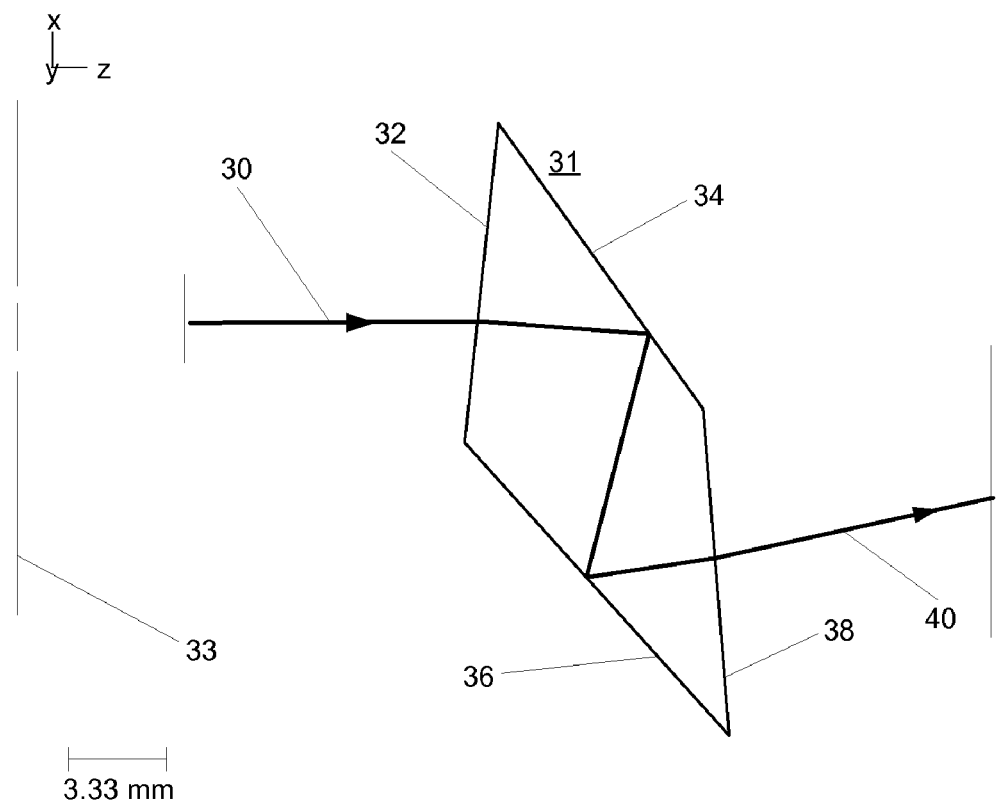
FIGS. 3A and 3B are a side view and a top view of an exemplary rhomboidal prism geometry that demonstrates gut-ray symmetry in one plane.
Figure 3B:
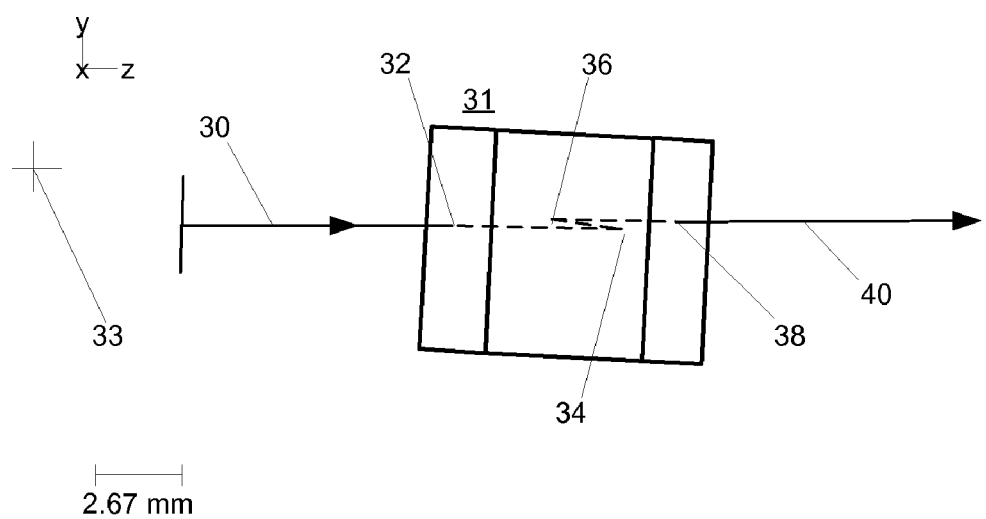

FIGS. 3A and 3B are a side view and a top view of an exemplary rhomboidal prism geometry that demonstrates gut-ray symmetry in only one plane. Referring to FIG. 3A, the incident ray 30 enters rhomboid prism 31, which is being rotated about rotational axis 33 (i.e., rotates about the x-axis). Rhomboid prism 31 is shown rotated from its mid-rotation position and into the plane of the figure by several degrees. Incident ray 30 is refracted through prism entry face 32, is reflected by prism surface 34, is reflected a second time from prism surface 36, and is refracted by prism exit face 38. The exiting ray 40 is shown at an angle with respect to the incident ray 30. This is because, although the included angle between surfaces 32 and 34 is the same as the included angle between surfaces 36 and 38, opposing surfaces 34 and 36 are not parallel. Surfaces 34 and 36 have a non-parallel included angle. In this plane, gut-ray symmetry is preserved at the incident and exiting refractive surfaces and at the two reflecting surfaces so that the exiting ray has a constant angle as the prism is rotated about axis 33 in this plane of action.

More specifically, the point of deflection symmetry is located along the gut-ray path between surfaces 34 and 36. The forward propagating gut-ray is reflected by surface 36 and refracted at exit face 38. The backwards propagating gut-ray is reflected by surface 34 and refracted at entrance face 32, by amounts equal to that of the forward propagating gut-ray. This is true for all relevant rotation positions of the device. Therefore, the rhomboid deflection device is gut-ray symmetric in this view.

FIG. 3B shows a top view of the rhomboid prism of FIG. 3A. The rotation of the prism around rotation axis 33 causes the gut-ray 30 to refract and reflect asymmetrically with respect to the forwards and backwards propagation paths. The ray deviation angles at the two reflective surfaces are seen to be additive rather than compensating. Gut-ray symmetry is therefore not preserved in this plane and the exit gut-ray angle in this view will have a small angular variation as the prism is rotated about axis 33. The gut-ray asymmetry is a result of the non-parallel included angle between the reflective surfaces 34 and 36. When the reflective surfaces cause the exit ray angle to be parallel to the incident ray angle, there is no asymmetry. The larger the deviation from this condition, the larger the asymmetry becomes, and the greater the variation of the exit ray angle becomes. By judicious choices of design parameters, this exit ray angular variation can be minimized and the angular variation is acceptable for certain classes of application.

FIGS. 4-8 illustrate various examples based on the principle of gut-ray symmetry. These Figures typically illustrate the principle of operation using a single deflection sector 8 as an example. This is for clarity of explanation. The optical pattern generator would contain many deflection sectors, with the deflections sectors designed to achieve different angular deflections.

Figure 4A:
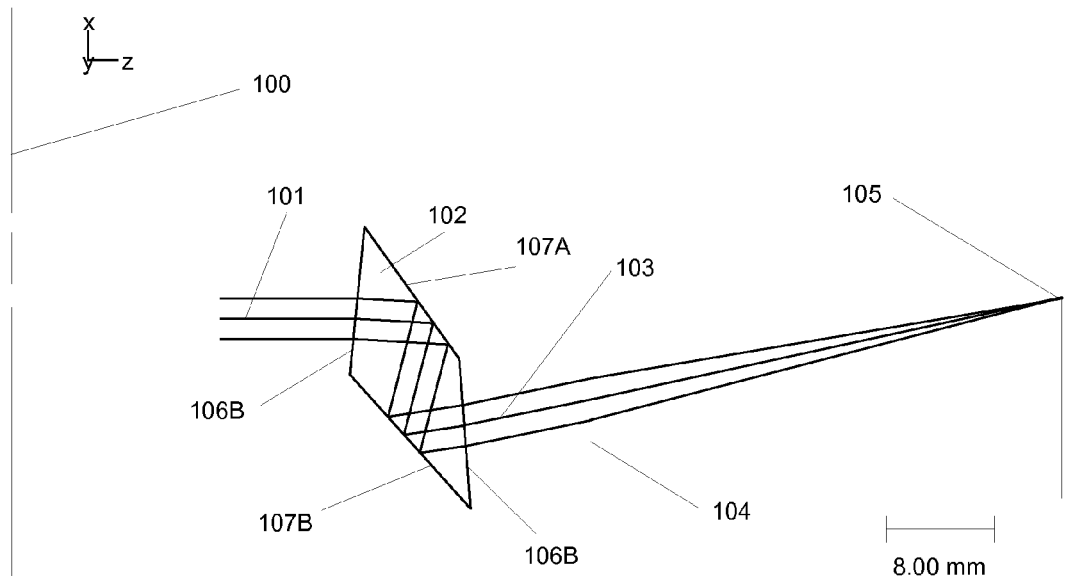
FIGS. 4A and 4B are a side view and a top view of an optical pattern generator based on the rhomboidal prism geometry of FIG. 3.
Figure 4B:
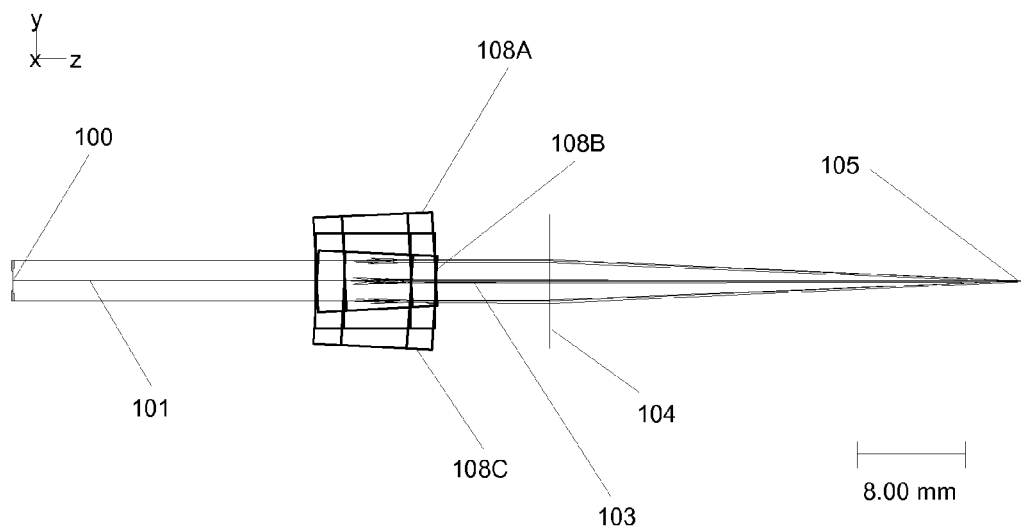

FIGS. 4A and 4B are a side view and a top view of an optical pattern generator based on the rhomboidal prism geometry of FIG. 3. This configuration shall be referred to as the Myers-Broome configuration. This rhomboid prism system 108 transforms a fixed incident optical beam 101 into an exiting optical beam 103 which has a fixed angular deviation from the input beam. The rhomboid prism 102 is rotated about the rotational axis 100 (about the x-axis). The entry and exit face dimensions of the rhomboid prism permit a rotation of several degrees without truncation of the incident or exiting optical beams. The exiting beam 103 passes through an imaging lens group 104 and is focused on a treatment zone 105. The prism geometry is chosen such that at the mid-rotation angle the gut-ray 101 has the same incidence angle at the entry face 106A and the exit face 106B. The prism geometry is further chosen such that the gut-ray 101 has the same incidence angle at the two reflecting surfaces 107A and 107B.

The rhomboid prism 102 is one of a plurality of prisms arranged on the periphery of a rotating disk that has a surface normal to the plane of the drawing and a rotation axis 100. Each of the prisms 102 has a different included angle between the reflecting surfaces 107A and 107B such that the exiting optical beam 103 for each prism has a different deflection angle that is a constant value while each prism rotates through the incident optical beam 101.

FIG. 4B shows a top view of this optical pattern generator with one rhomboid prism rotated to three positions 108A, 108B, and 108C, such that the incident optical beam 101 is imaged at a single fixed image point 105. As described with respect to FIG. 3, the rhomboid prism of FIG. 4B does not satisfy gut-ray symmetry. The entering gut-ray and the exiting gut-ray are very slightly angularly displaced in this view. The exit ray angle will therefore have a small variation in angle as the prism 108 rotates in this plane of action. However, because the violation of the gut-ray symmetry condition in the view shown by FIG. 4B is small in magnitude, the variation in exit ray angle will also be small in magnitude. By the judicious application of the gut-ray principle and the choice of design parameters, the variation in exit ray angle in this plane of action can be kept small enough for many applications.

Figure 5A:
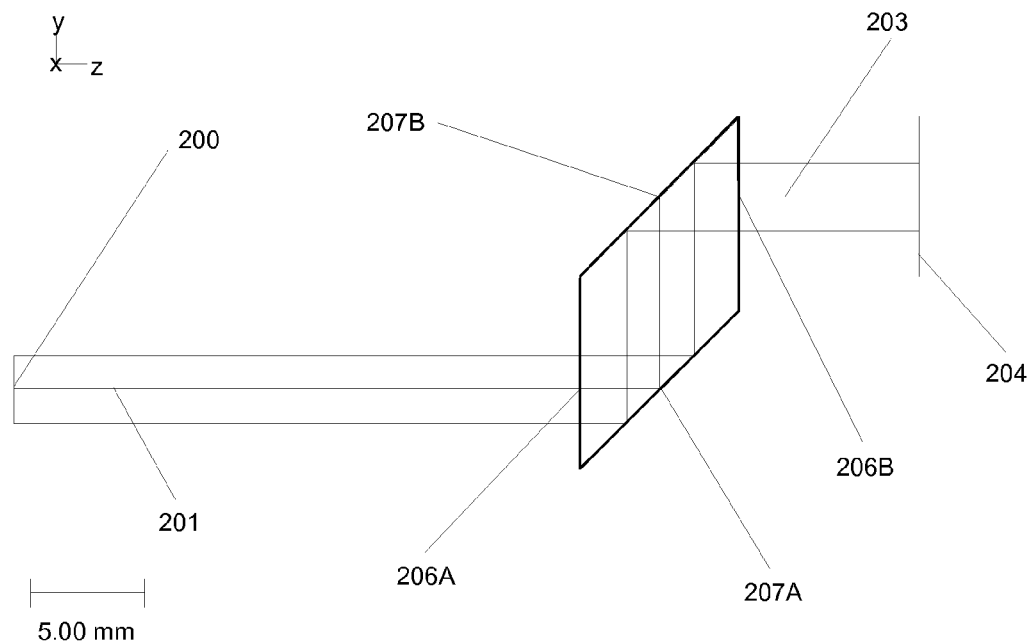
FIGS. 5A and 5B are side views of a second embodiment of an optical pattern generator based on the two-reflector principle of FIG. 2.
Figure 5B:
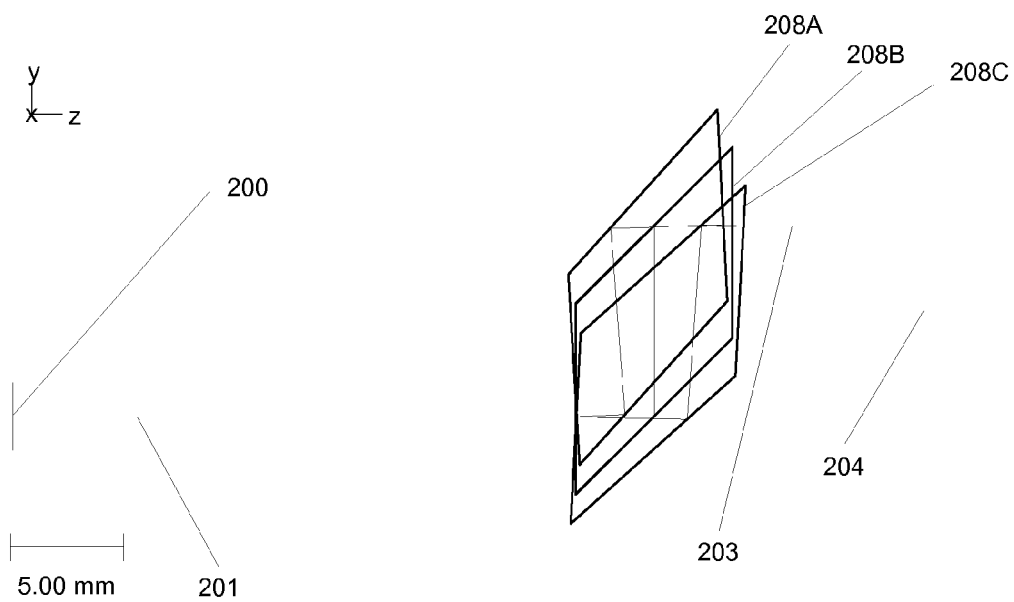

FIGS. 5A and 5B are side views of a second embodiment of an optical pattern generator based on the two-reflector principle of FIG. 2. In this case, however, the two mirrors of FIG. 2 are replaced by a rhomboid prism 208. This configuration will be referred to as the DeBenedictis Rhomboid configuration. In this embodiment, the rhomboid prisms are placed on a rotating disk such that the gut-ray principle is satisfied in both planes of action and the output ray angle is constant in both planes of action.

FIG. 5A shows a side view of one rhomboid prism 208 rotating about a rotational axis 200 (about the x-axis). Rotation of prism 208 is therefore in the plane of FIG. 6. Incident gut-ray 201 refracts at the prism entry face 206A, reflects from surface 207A, reflects at surface 207B and refracts through prism exit face 206B to become exit ray 203 and finally enter lens 204 for imaging onto the target. FIG. 5B shows a side view of the rhomboid prism rotated to three positions 208A, 208B, and 208C with rotation about the axis 200.

In these Figures, gut-ray symmetry is satisfied in the y-z plane because refraction at surface 206A is symmetric to refraction at surface 206B and because reflection at surface 207A is symmetric to reflection at surface 207B. Gut-ray symmetry is satisfied in the x-z plane because all incident angles are zero (see FIG. 2B). Because the gut-ray symmetry condition is satisfied in both planes of action, the exit ray 203 maintains a constant angle during system rotation and lens 204 transforms this constant angle to a fixed and unmoving image point.

Figure 6A:
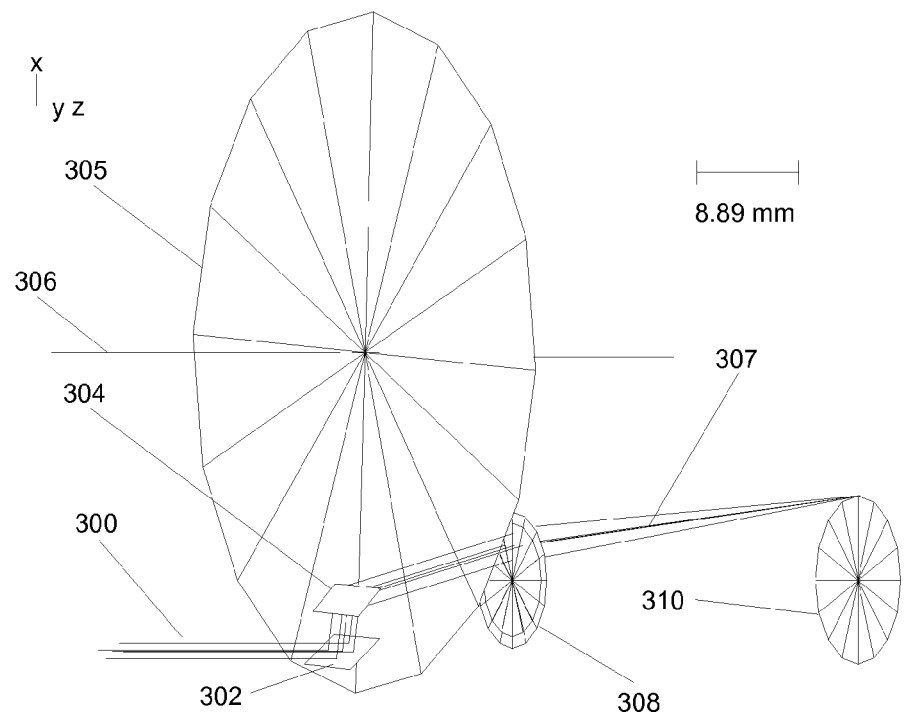
FIGS. 6A, 6B and 6C are a perspective view, side view and top view of another embodiment of an optical pattern generator.
Figure 6B:
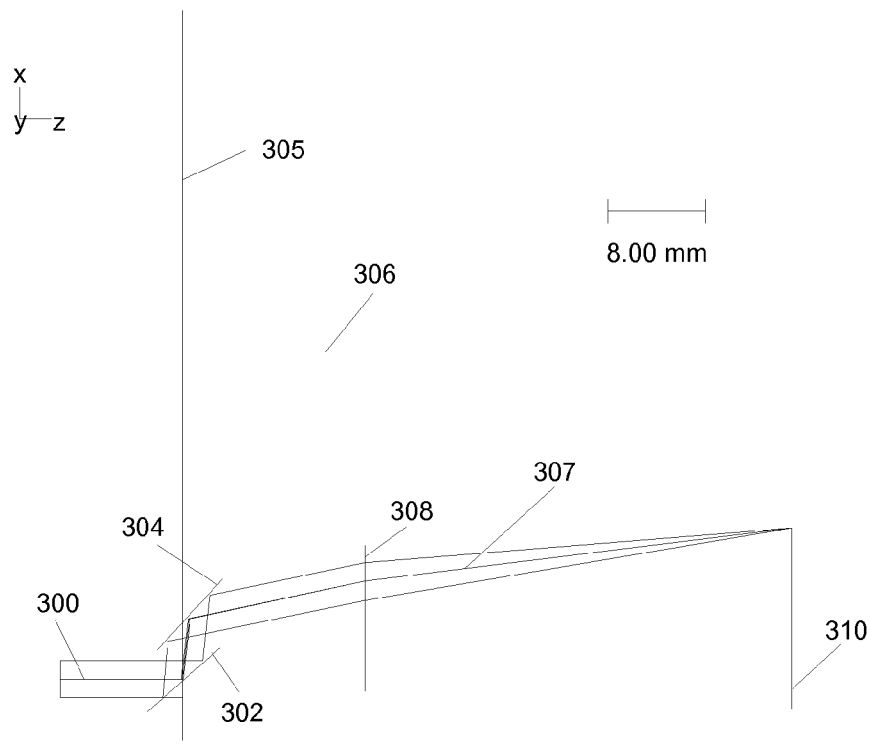
Figure 6C:
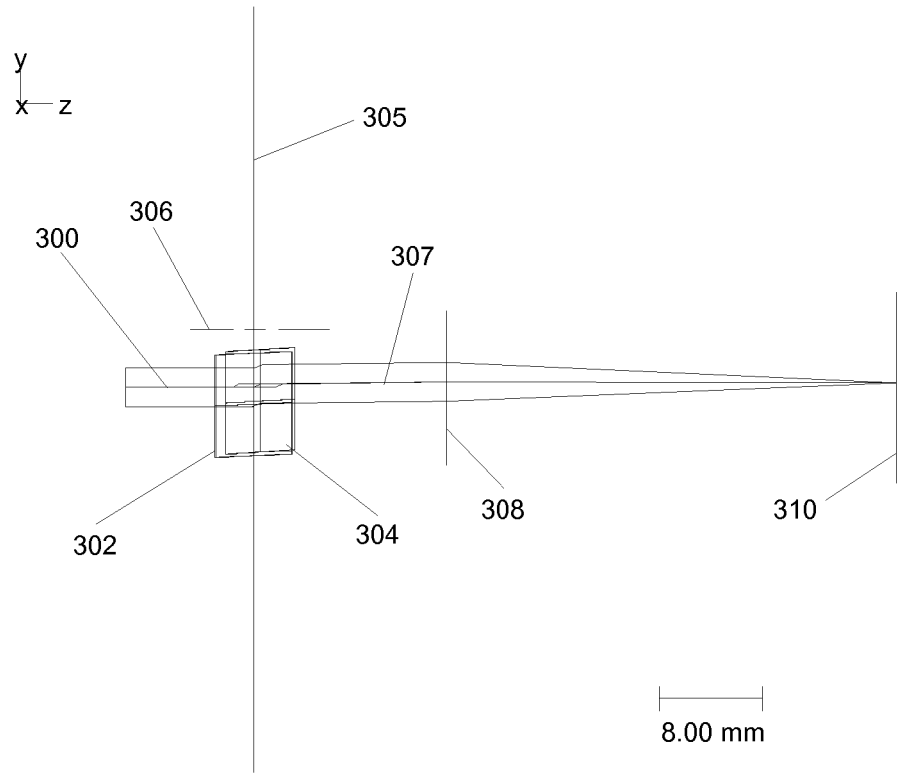

FIGS. 6A, 6B and 6C are a perspective view, a side view and a top view of another embodiment of an optical pattern generator. This example is based on two-mirror deflection sectors but the geometry is similar to a boat's paddlewheel and will be referred to as the paddlewheel geometry. Referring to FIG. 6A and 6B, this embodiment places sets of rhomboid mirrors shown as surfaces 302 and 304 or rhomboid prisms at the edge of a rotating disk 305, which has a rotational axis 306 (i.e., rotation about the z axis). The entering gut-ray 300 is first reflected from mirror 302 and subsequently is reflected by mirror 304. Lens 308 images the exiting gut-ray 307 onto image surface 310. Gut-ray symmetry is satisfied for the plane of action shown in FIG. 6B.

FIG. 6C is a top view of the paddlewheel geometry. In this view, gut-ray symmetry is violated because the reflection at the two mirror surfaces are additive and not symmetric. The exiting gut-ray 307 will vary moderately with system rotation in this plane of action. However, as before, careful choice of system design parameters can keep this variation of output ray angle small enough for some applications.

Figure 7C:
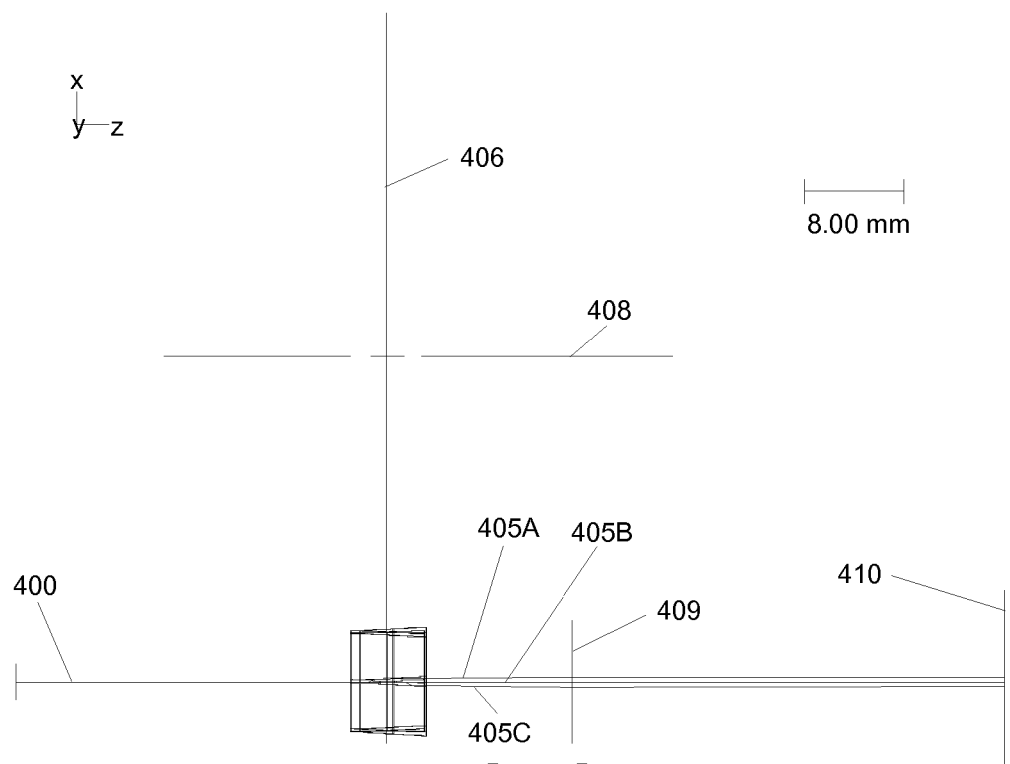
FIGS. 7A, 7B and 7C are a perspective view, side view and top view of yet another embodiment of an optical pattern generator.
Figure 7A:
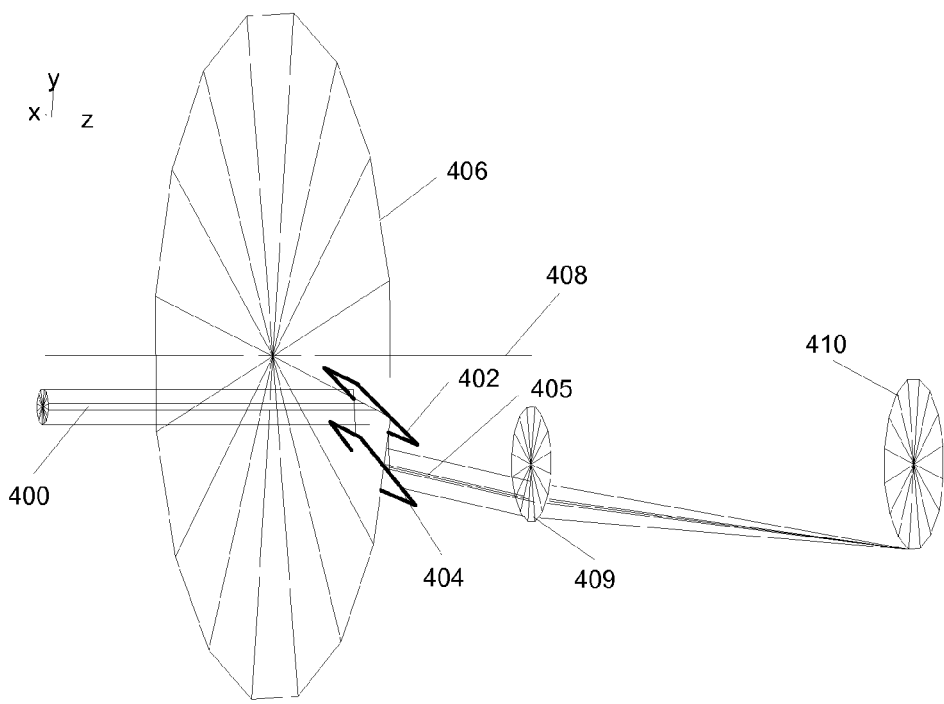
Figure 7B:
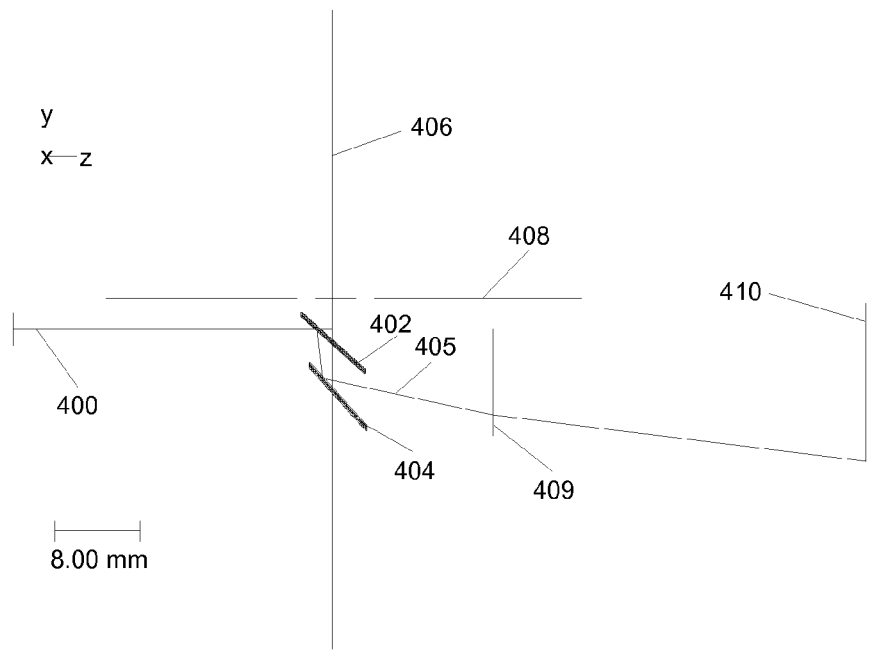

FIGS. 7A, 7B and 7C are a perspective view, side view and top view of yet another embodiment of an optical pattern generator. This geometry will be referred to as the sidewheel geometry. In FIG. 7A, entering gut-ray 400 is first reflected from mirror 402, subsequently reflected from mirror 404, and exits as gut-ray 405. The mirrors 402 and 404 are mounted on the periphery of disk 406 which has a rotation axis 408 (the z-axis). The exiting gut ray 405 enters lens 409 and is focused on image surface 410.

FIG. 7B is a side view of the sidewheel optical pattern generator. Mirrors 402 and 404 are observed on the periphery of disk 406 which rotates about axis 408. The entering gut-ray 400 passes through the two-mirror system (or alternately a rhomboid prism) and becomes exiting gut-ray 405. Careful observation shows that gut-ray symmetry is preserved in this view, so the output angle remains a constant value as the system rotates.

FIG. 7C is a top view of the sidewheel optical pattern generator. In this view, gut-ray symmetry is violated in reflection between mirrors 402 and 404 so the exiting gut-ray 405 will have a modest variation of output angle as the system rotates. If the design parameters are carefully chosen, the variation in output angle can be kept small enough for certain applications.

Figure 8A:
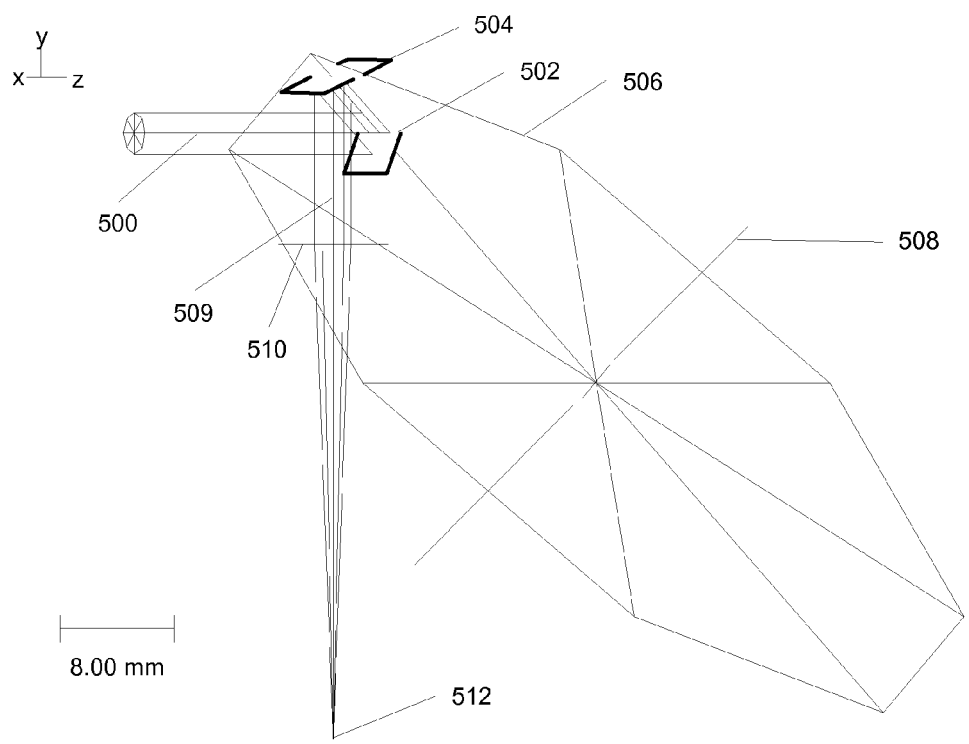
FIGS. 8A, 8B and 8C are a perspective view, side view and top view of yet another embodiment of an optical pattern generator.
Figure 8B:
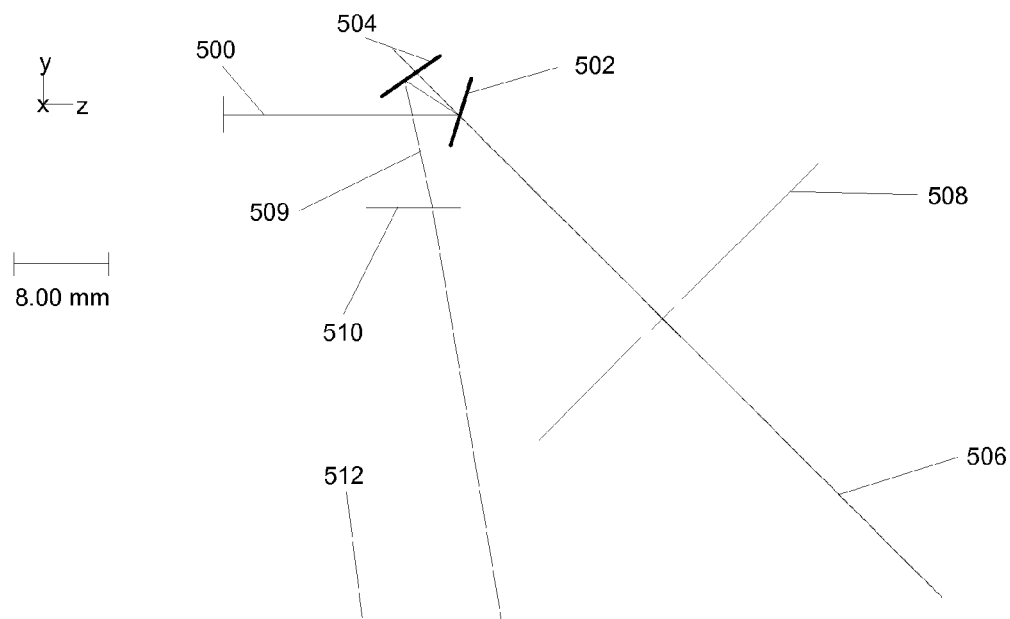
Figure 8C:
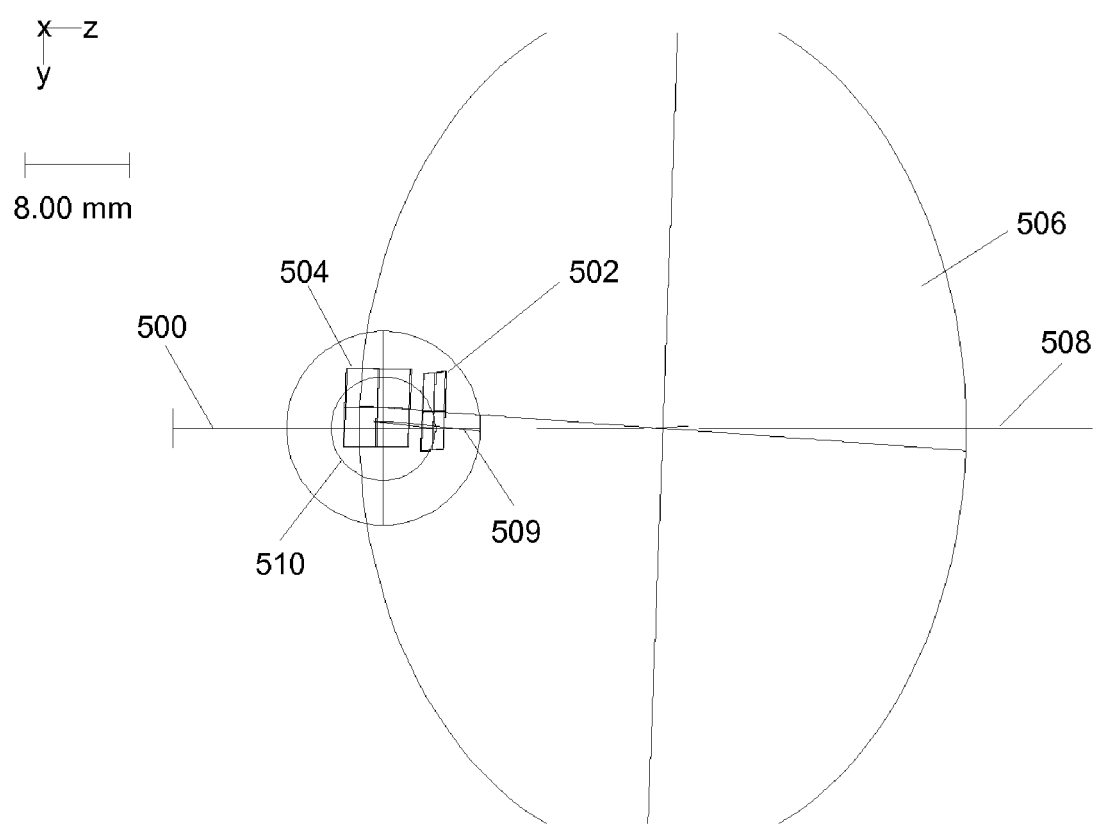

FIGS. 8A, 8B and 8C are a perspective view, side view and top view of yet another embodiment of an optical pattern generator, which is not gut-ray symmetric. In this embodiment, two mirrors 502 and 504 are arranged in a penta-mirror geometry. Alternatively the two mirrors 502 and 504 can be replaced with a penta-prism. Note that this embodiment uses a penta-mirror geometry whereas the previous embodiments all used a rhomboid geometry. This embodiment of the invention further validates the value of the gut-ray symmetry principle. This example is not gut-ray symmetric in either plane of action and, as a result, has ray angle variation in both planes of action. This example shows the utility of applying the gut-ray symmetry principle to predict ray angle stability failure.

Referring to FIG. 8A, entry gut-ray 500 first reflects from mirror 502 and subsequently reflects from mirror 504 to become exiting gut-ray 509. Mirrors 502 and 504 are mounted on the periphery of a disk 506 which rotates about axis 508 (which lies in the y-z plane at a 45 angle to the y and z axes, see FIG. 8B). Lens 510 images the exiting gut-ray 509 onto the image surface 512. In this geometry, the rotating disk is at a 45 degree tilt with respect to the entering gut-ray 500. This arrangement provides a compact system geometry and is useful for ergonomic purposes for certain hand-held instruments, but the output ray angle varies with rotation angle in this view.

FIG. 8B shows a side view of the penta-wheel optical pattern generator. In this view, careful observation shows that the included angle for the incident and reflected gut-ray 500 at mirror 502 is slightly different from the included angle for the incident and reflected gut-ray at mirror 504. This gut-ray symmetry violation means that the exiting gut-ray 509 will have an output angle that varies a small amount as the system rotates in this view.

FIG. 8C shows a top view of the penta-wheel optical pattern generator. In this view, the gut-ray 500 reflection at mirror 502 is not symmetric with the gut-ray 500 reflection at mirror 504. The gut-ray symmetry violation in this view is rather large and predicts that a fairly large variation of the exiting gut ray 509 output angle will occur as the system rotates about axis 508. The symmetry violation for this embodiment is large because a penta-mirror geometry is used and because the rotation axis is not in either plane of action of the penta-mirror-pair. Prior embodiments using rhomboid geometries produce smaller symmetry violations. There are some applications such as micro-welding devices that can advantageously use this image movement to produce stronger weld spots, so this embodiment can still be useful for certain selected applications.

Figure 9:
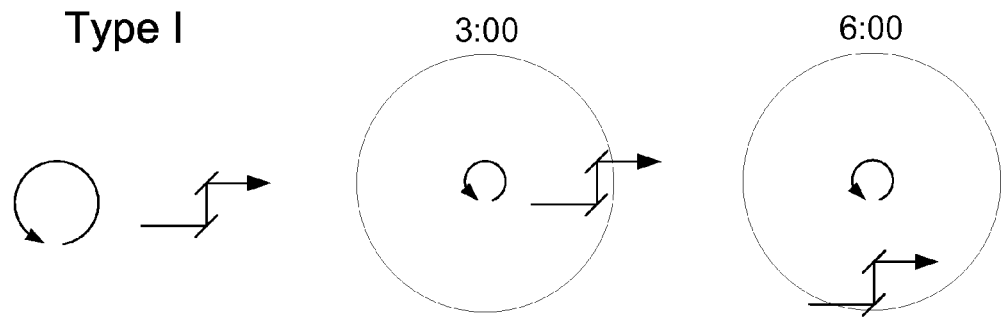
FIG. 9 illustrates a systematic approach to gut-ray symmetry for rotations of a pair of rhomboid surfaces about three orthogonal axes.
Figure 9:
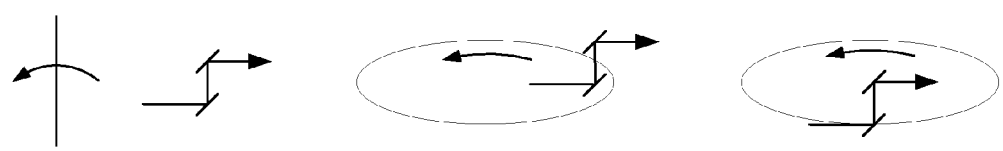
Figure 9:
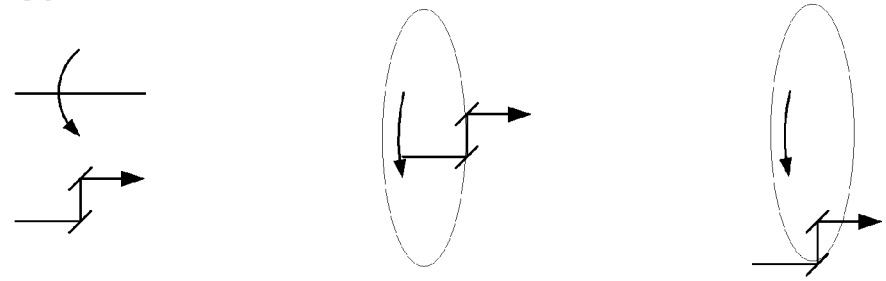

FIG. 9 illustrates a systematic approach to gut-ray symmetry. The basic rhomboid geometry can be drawn as a "Z-fold" between two mirrors. This geometry can then be rotated around any of the three axes, as shown in FIG. 9. Type I rotation is rotation of the rhomboid geometry about the x-axis. This rotation is demonstrated in the example of FIG. 2. Type II rotation is rotation of the rhomboid geometry about the y-axis. This is demonstrated in the example of FIG. 3. Type III rotation is rotation of the rhomboid geometry about the z-axis. See, for example, FIG. 7a. Different rotation types will be gut-ray symmetric with respect to different planes.

Now add the disk (i.e., multiple sectors). This is shown in the two righthand columns of FIG. 9, labelled 3:00 and 6:00 to indicate the location of the mirror pair when the optical beam is incident. For Type I, the disk lies in the plane of the paper. Locating the rhomboid geometry at different positions on the disk yields different geometry. For example, placing the rhomboid geometry at the 3:00 position yields the geometry of FIG. 5 (Debenedictis rhomboid scanner). Placing the rhomboids at 6:00 yields a geometry not expressly discussed above but still within the scope of the invention.

For the illustrations of Type II and III rotation in FIG. 9, perspective views of the disks are shown. For Type II rotation, placing the rhomboids at 3:00 yields the geometry of FIG. 4 (Myers-Broome scanner). The 6:00 position is not expressly discussed above but still within the scope of the invention. For Type III rotation, placing the rhomboids at 3:00 yields the sidewheel configuration (FIG. 7). Placing at 6:00 yields the paddlewheel configuration (FIG. 6).

These are just examples. The invention is not limited to orthogonal placements. For example, the rotational axis is not limited to strictly, x, y or z-axis; and the rhomboid placement is not limited to just 3:00 or 6:00, and the basic rhomboid geometry is not limited to right angle and 45 degree mirrors. Other combinations will be apparent.

Therefore, although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

What is claimed is:

1. An optical pattern generator comprising:
a rotating component having a plane of rotation and a rotation axis, the rotating component divided into a plurality of sectors arranged in a circle centered on the rotation axis, each sector including a pair of reflecting surfaces that rotate through an incident gut ray of an optical beam as the rotating component rotates about its rotation axis, the incident gut ray propagating in a direction that is substantially parallel to the plane of rotation of the rotating component, each pair of reflecting surfaces positioned to be gut-ray symmetric with respect to the gut ray, and each pair of reflecting surfaces arranged in a rhomboid geometry, whereby the exiting gut ray is deflected by substantially constant angles in two orthogonal planes as each pair of reflecting surfaces rotates through the incident gut ray.

2. The optical pattern generator of claim 1 wherein the reflective surfaces having surface normals that lie in the plane of rotation.

3. The optical pattern generator of claim 2 wherein each pair of reflecting surfaces comprises two surfaces of a rhomboid prism.

4. The optical pattern generator of claim 2 wherein different pairs of reflecting surfaces have different included angles, whereby the gut ray is deflected by substantially constant angles in two orthogonal planes as each pair of reflecting surfaces rotates through the incident gut ray but the constant angles differ for different pairs of reflecting surfaces.

5. An optical pattern generator comprising:
a rotating component having a plane of rotation and a rotation axis, the rotating component divided into a plurality of sectors arranged in a circle centered on the rotation axis, each sector including a pair of reflecting surfaces that rotate through an incident gut ray of an optical beam as the rotating component rotates about its rotation axis, the incident gut ray propagating in a direction that is substantially parallel to the plane of rotation of the rotating component, the incident gut ray propagating in a direction that is substantially parallel to a plane of rotation of the rotating component, each pair of reflecting surfaces positioned to deviate from gut-ray symmetry by a tolerable amount, and each pair of reflecting surfaces arranged in a rhomboid geometry, whereby the incident gut ray is deflected by angles in two orthogonal planes that vary by a tolerable amount as each pair of reflecting surfaces rotates through the incident gut ray.

6. The optical pattern generator of claim 5 wherein each pair of reflecting surfaces satisfies gut-ray symmetry in one of the two orthogonal planes and deviates from gut-ray symmetry by a tolerable amount in the other orthogonal plane.

7. The optical pattern generator of claim 6 wherein each pair of reflecting surfaces comprises two surfaces of a rhomboid prism.

8. The optical pattern generator of claim 6 wherein different pairs of reflecting surfaces have different included angles, whereby the gut ray is deflected by different angles for different pairs of reflecting surfaces.

9. The optical pattern generator of claim 5 wherein different pairs of reflecting surfaces have different included angles, whereby the gut ray is deflected by different angles for different pairs of reflecting surfaces.

* * * * *

UNITED STATES PATENT AND TRADEMARK OFFICE
CERTIFICATE OF CORRECTION

| | | |
|---|---|---|
| PATENT NO. | : 7,995,259 B2 | Page 1 of 1 |
| APPLICATION NO. | : 12/125052 | |
| DATED | : August 9, 2011 | |
| INVENTOR(S) | : Barry G. Broome et al. | |

It is certified that error appears in the above-identified patent and that said Letters Patent is hereby corrected as shown below:

At column 9, line number 61, change "are" to --is--.

At column 12, claim 2, line number 13, change "having" to --have--.

Signed and Sealed this
Eleventh Day of October, 2011

David J. Kappos
*Director of the United States Patent and Trademark Office*